United States Patent [19]

Nahachewski

[11] Patent Number: 4,852,900

[45] Date of Patent: Aug. 1, 1989

[54] FOOT GUARDS FOR ALL TERRAIN VEHICLES

[76] Inventor: Vladimir W. Nahachewski, Box 36, R.R. #5, Site 11, Pleasant Valley Road, Vernon, British Columbia, Canada, V1T 6L8

[21] Appl. No.: 194,038

[22] Filed: May 12, 1988

[51] Int. Cl.⁴ ............................................. B62J 25/00
[52] U.S. Cl. .................................... 280/291; 180/210; 280/304.4
[58] Field of Search ........... 280/289 R, 289 G, 289 E, 280/291; 180/210, 211, 215

[56] References Cited

U.S. PATENT DOCUMENTS

| | | | |
|---|---|---|---|
| 1,941,801 | 1/1934 | Harley | 280/289 R |
| 4,136,890 | 1/1979 | Vertucci | 280/289 S |
| 4,412,595 | 11/1983 | Kinzel | 180/211 |
| 4,673,190 | 6/1987 | Ahlberg | 280/289 G |
| 4,728,121 | 3/1988 | Graves | 280/289 G X |
| 4,768,799 | 9/1988 | Millican | 280/291 |

*Primary Examiner*—Mitchell J. Hill
*Attorney, Agent, or Firm*—Bull, Housser & Tupper

[57] ABSTRACT

A device for protecting a foot of a rider of an all terrain vehicle includes a frame having a front end and a rear end, the frame including a connector for connecting the frame to the vehicle so that the frame is substantially horizontal in use. The frame is adapted to abut one of the foot rests of the vehicle when connected to the vehicle and extends forwardly and aft of the one foot rest. The device also includes a deflector member connected to the frame adjacent the rear end of the frame so that the deflector member extends upwardly in use and extends generally parallel to the axle so that the rider's foot is protected from a rear wheel of the vehicle behind said one foot rest.

1 Claim, 2 Drawing Sheets

FOOT GUARDS FOR ALL TERRAIN VEHICLES

FIELD OF THE INVENTION

The present invention relates to a device for protecting a foot of a rider of an all terrain vehicle having a pair of spaced-apart rear wheels with an axle therebetween and at least one front wheel, the vehicle including a foot rest connected to the vehicle a distance in front of each of the rear wheels.

BACKGROUND OF THE INVENTION

All terrain vehicles have become very popular. The vehicles typically include a foot rest connected a distance in front of each of the rear wheels. The vehicle enables the rider to negotiate a wide variety of terrains. However, there have been an increasing number of accidents involving serious injury and sometimes death to the rider. In particular, when the all-terrain vehicle is being used in a wooded area or in an area with a large concentration of low bushes or plants, it is possible that a branch, bush or the like will contact one of the rider's feet which is resting on the foot rest and cause the foot to contact a rear wheel. In this event, the rear wheel could run over the rider's foot thereby causing serious injury thereto. The rider himself may be thrown off the vehicle if his foot is so run over by one of the rear wheels. This can be quite hazardous if the vehicle is traveling at a high rate of speed.

U.S. Pat. No. 1,941,801 (Harley) discloses a motorcycle protecting guard. The Harley device is adapted to protect the legs of the rider from breakage during collisions and also serves as a shoe or runner to support both the motorcycle and the rider while propelled by momentum along a roadway after an upset. The Harley device, however, could not be used on an all terrain vehicle to protect the rider's foot from being run over from one of the rear wheels.

U.S. Pat. No. 4,673,190 (Ahlberg) discloses a protective bar assembly for a motorcycle. The Ahlberg device is not designed for use with an all terrain vehicle and would not serve to protect the rider's foot from being run over by one of the rear wheels.

U.S. Pat. No. 4,136,890 (Vertucci) discloses a combination leg shield and crash bar for motorcycles. The Vertucci device is not designed for use with an all terrain vehicle.

Another patent of interest is U.S. Pat. No. 4,412,595 (Kinzel).

SUMMARY OF THE INVENTION

The present invention reduces the difficulties and disadvantages of the prior art by providing a device for protecting a foot of a rider of a vehicle having a pair of spaced-apart rear wheels with an axle therebetween and at least one front wheel, the vehicle including a foot rest connected to the vehicle a distance in front of each of the rear wheels. The device includes a frame having a front end and a rear end, the frame including means for connecting the frame to the vehicle so that the frame is substantially horizontal in use. The frame is adapted to abut one of the foot rests when connected to the vehicle and extends forwardly an aft of the one foot rest. The device also includes a deflector member connected to the frame adjacent the rear end of the frame so that the deflector member extends upwardly in use and extends generally parallel to the axle so that the rider's foot is protected from one of the rear wheels behind said one foot rest.

The frame may be a rectangular perimeter frame including an inner elongated member, an outer elongated member, a front elongated member and a rear elongated member. The frame may further include a brace member extending between the front and rear elongated members and the brace member may be adjacent the outer elongated member.

The deflector member may have one end connected to the rear elongated member, another end connected to the outer elongated member and a curved portion extending outwardly from the outer elongated member so that the device protects the rider's foot if the vehicle tips over on its side.

In another embodiment, the invention relates to a device for protecting a foot of a rider of a vehicle having a pair of spaced-apart rear wheels with an axle therebetween and at least one front wheel. The device includes a foot rest having means for connecting the foot rest to the vehicle adjacent one of the rear wheels and a frame having a front end and a rear end. The frame is substantially horizontal in use and is adapted to abut the foot rest and has means for connecting the device to the vehicle in front of said one of the rear wheels. The device also includes a deflector member connected to the frame adjacent the rear end of the frame so that the deflector member extends upwardly in use and extends generally parallel to the axle so that the rider's foot is prevented from being run over by the rear wheel.

In another embodiment, the invention relates to a combination of a vehicle having a pair of spaced-apart rear wheels with an axle therebetween, and at least one front wheel, the vehicle including a foot rest connected a distance in front of each of the rear wheels. The combination also includes a pair of devices for protecting the foot of the rider of the vehicle, each said device comprising a frame which is substantially horizontal in use, the frame having a front end and a rear end. The frame also includes means for connecting the frame to the vehicle so that the frame abuts one of the foot rests. The frame also includes a deflector member connected to the frame adjacent the rear end of the frame so that the deflector member extends upwardly in use and extends generally parallel to the axle so that one of the rider's feet is protected from the rear wheel behind said one foot rest.

BRIEF DESCRIPTION OF THE DRAWINGS

In drawings which illustrate embodiments of the invention.

DESCRIPTION OF THE PREFERRED EMBODIMENT

Figure 2:
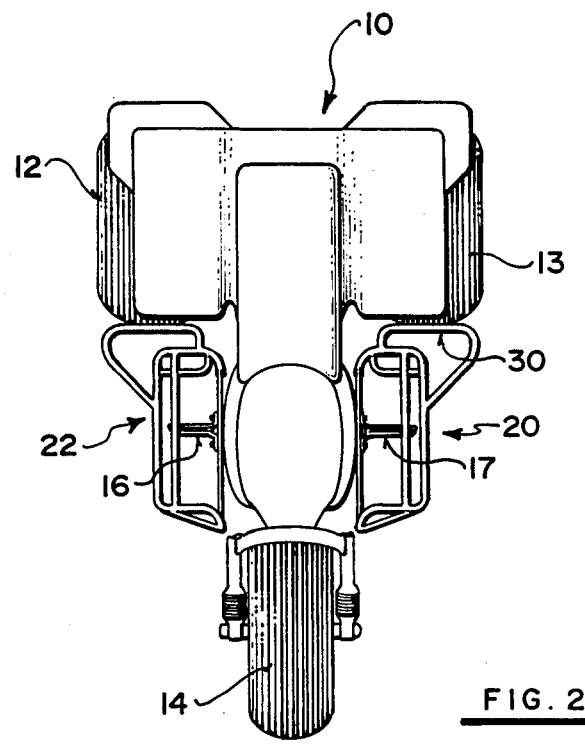
FIG. 2 is a top view of an all terrain vehicle, the device of FIG. 1 being connected to the vehicle in front of a left rear wheel, a left foot rest of the vehicle abutting a bottom side of a brace member of the device, there being another device, which is a mirror image of the device of FIG. 1, connected to the vehicle in front of a right rear wheel.
Figure 3:
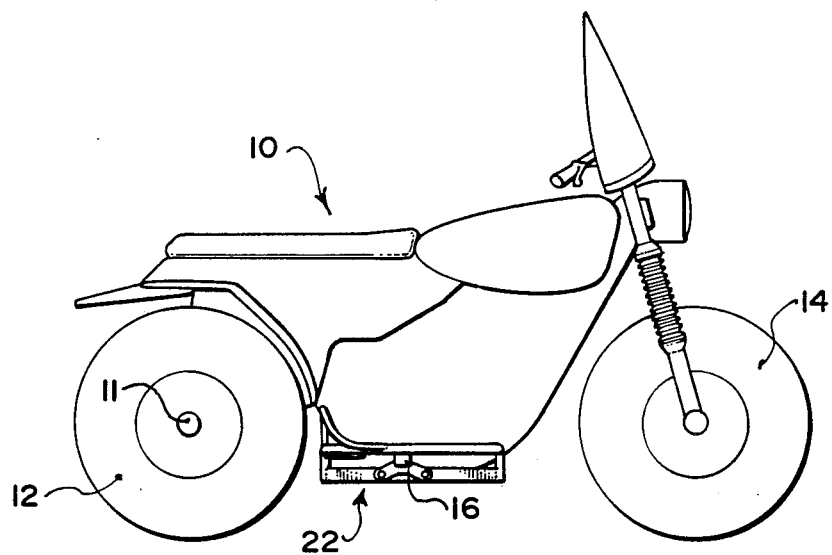
FIG. 3 is a side view of the vehicle of FIG. 2 showing said device connected to the vehicle in front of the right rear wheel.

FIGS. 2 and 3 show an all terrain vehicle generally designated as 10. The vehicle 10 has a pair of spaced-apart rear wheels 12 and 13 with an axle 11 therebetween. The rear wheel 12 is on the right-hand side of the vehicle 10 and the rear wheel 13 is on the left-hand side of the vehicle 10. The vehicle 10 also has a front wheel 14. The vehicle 10 has a foot rest connected adjacent the front of each of the rear wheels. A right foot rest 16 is connected to the vehicle 10 in front of the right rear wheel 12 and a left foot rest 17 is connected to the vehicle 10 in front of the left rear wheel 13.

Figure 1:
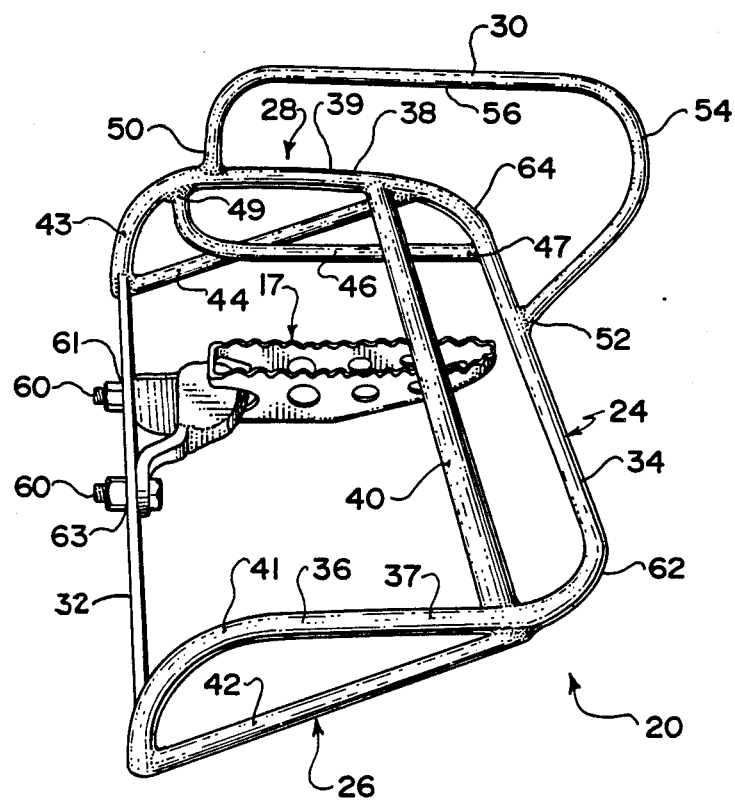
FIG. 1 is a perspective of a device for protecting a foot of a rider of an all terrain vehicle, the device having a foot rest connected thereto.

A device for protecting a foot of a rider of the vehicle 10, generally designated as 20, is shown in FIG. 1. The device 20 is to be connected to the vehicle 10 in front of the left rear wheel 13. As shown in FIG. 2, there is another device 22, being a mirror image of the device 20, connected to the vehicle 10 in front of the right rear wheel 12. The following description refers to the device 20 but it is to be understood that the device 22 is a mirror image of the device 20 and equivalent thereto in structure.

The device 20 includes a frame 24 having a front end 26 and a rear end 28. The frame 24 is adapted to abut the left foot rest 17 and includes means for connecting the frame 24 to the vehicle 10 so that the frame 24 is substantially horizontal in use. As shown in FIGS. 1 and 2, the frame 24 extends forwardly and aft of the left foot rest 17. The device 20 includes a deflector member 30 connected to the frame 24 adjacent the rear end 28 so that the deflector member 30 extends upwardly in use and extends generally parallel to the axle 11 so that the rider's foot is protected from the left rear wheel 13 behind the left foot rest 17.

As shown in FIGS. 1 and 2, the frame 24 is a rectangular perimeter frame including an inner elongated member 32, an outer elongated member 34, a front elongated member 36 and a rear elongated member 38. The front and rear members have straight portions 37 and 39 respectively which are co-planar with outer member 34 in this embodiment and adjacent thereto. Inner member 32 is below the plane of members 36, 38 end 34 when the device is positioned for use. Curved portions 41 and 43 of members 36 and 38 extend downwardly to connect to member 32.

The frame 24 also includes a brace member 40 extending between the front elongated member 36 and the rear elongated member 38. The brace member 40 is adjacent the outer elongated member 34. The left foot rest 17 abuts a bottom side of the brace member 40.

There is a foot-supporting member 46 having an end 47 connected to member 34 and which extends parallel to member 38 and spaced-apart therefrom. Member 46 curves through 90 degrees adjacent opposite end 49 to connect to member 38. Member 46 is connected to member 40 intermediate ends 47 and 49.

The deflector member 30 has one end 50 connected to the rear elongated member 38, another end 52 connected to the outer elongated member 34, and a curved portion 54 extending outwardly from the outer elongated member 34 between ends 50 and 52 so that the device 20 protects the rider's leg if the vehicle 10 tips over on its side. Curved portion 54 contacts the ground in the event of such a tip over, so the leg and foot are not jammed between the vehicle and the ground. As shown in FIG. 1, the deflector member 30 includes a straight elongated portion 56 which is parallel to the axle 11 and adjacent the left rear wheel 13.

The left foot rest 17 is conventionally connected to the vehicle 10 by a pair of spaced-apart bolts 60 which are received by a pair of threaded openings (not shown) on the vehicle in front of the left rear wheel 13. The right foot rest 16 is similarly connected to the vehicle 10 in front of the right rear wheel 12. In this embodiment, the means for connecting the frame 24 to the vehicle 10 includes a pair of spaced-apart apertures located at 61 and 63 extending through the inner elongated member 32, the apertures being alignable with the pair of bolts 60 and the threaded openings to connect the device 20 to the vehicle 10.

The frame 24 may include a front brace member 42 and a rear brace member 44. The frame 24 may also include a rear foot supporting member 46 having one end connected to the rear elongated member 38 and another end connected to the outer elongated member 34.

As shown in FIG. 1, the front elongated member 36, the outer elongated member 34 and the rear elongated member 38 may be one single elongated member having approximately 90° bends therein as at 62 and 64.

OPERATION

The vehicle 10 usually includes the right and left foot rests 16 and 17 respectively. To connect the device 20 to the vehicle 10, the user would remove the left foot rest 17 by removing the bolts 60 from the threaded openings in the vehicle. The user would then place the left foot rest 17 within the device 20 so that the former abuts the bottom side of the brace member 40, as shown in FIG. 1. In this position, the bolts 60 of the left foot rest 17 can be inserted into the apertures in the inner elongated member 32. The device 20, with the left foot rest 17 connected thereto, is then placed in front of the left rear wheel 13 so that the bolts 60 align with the threaded openings in the vehicle 10. The user then threads the bolts 60 into the openings so that the device 20 is secured to the vehicle 10.

The device 22 is connected to the vehicle 10 in the same manner as the device 20.

With the devices 20 and 22 connected to the vehicle 10 in front of the left and right rear wheels 13 and 12 respectively, the user can ride the vehicle 10 in the normal fashion. The rider's feet will be supported by the right and left foot rests 16 and 17 and the heel of the foot can rest on the rear foot-supporting member 46 if desired. If the vehicle is being used in a wooded area or an area with a large concentration of low bushes or plants, and if the front of one of the rider's feet is contacted by a branch, bush or the like, the rear of the foot cannot contact the rear wheel because the straight, elongated portion 56 of the deflector member 30 is disposed between the rider's foot and the rear wheel. Accordingly, the rider's foot cannot be run over by the rear wheels. In addition, if the vehicle 10 was to tip on its side, the rider's foot would not be crushed between the ground and the vehicle 10 because the curved portion 54 of the deflector member 30 would contact the ground thereby reducing the possibility that the rider's foot or leg would be injured.

It is to be understood that the invention is not confined to the particular construction and arrangement of parts as herein illustrated and described, but embraces all such modified forms thereof as come within the scope of the following claims.

What is claimed is:
1. A combination of:
(a) an all terrain vehicle having a pair of spaced apart rear wheels with an axle therebetween, and at least one front wheel, the vehicle including a foot rest connected a distance in front of each of the rear wheels; and
(b) a pair of devices for protecting the foot of a rider of the vehicle, each said device comprising a frame having a rectangular perimeter, the frame being substantially horizontal in use, the frame having a front end and a rear end front and rear elongated members, and inner and outer elongated members, the front and rear elongated members having portions coplanar with and adjacent the outer member and having curved portions adjacent the inner member and connected thereto, the inner member being below the outer member in use, the frame including means for connecting the frame to the vehicle so that the frame abuts one of the foot rests, and a deflector member connected to the frame adjacent the rear end of the frame so that the deflector member extends upwardly from the frame in use and extends generally parallel to the axle so that the rider's foot is protected from the rear wheel behind said one foot rest.

* * * * *